United States Patent [19]

Sakakibara

[11] Patent Number: 4,559,850
[45] Date of Patent: Dec. 24, 1985

[54] STEPLESS AUTOMATIC TRANSMISSION FOR MOTOR VEHICLES

[75] Inventor: Shiro Sakakibara, Anjo, Japan

[73] Assignee: Aisin-Warner, Ltd., Aichi, Japan

[21] Appl. No.: 555,596

[22] Filed: Nov. 28, 1983

[30] Foreign Application Priority Data

Nov. 30, 1982 [JP] Japan .................................. 57-210809
Nov. 30, 1982 [JP] Japan .................................. 57-210813

[51] Int. Cl.$^4$ ........................ B60K 41/12; F16H 11/06
[52] U.S. Cl. ........................................ 74/868; 74/866; 474/12
[58] Field of Search ................. 74/862, 865, 866, 867, 74/868; 474/752 A, 28, 12

[56] References Cited

U.S. PATENT DOCUMENTS

| | | | |
|---|---|---|---|
| 4,458,318 | 7/1984 | Smit et al. | 474/28 X |
| 4,459,878 | 7/1984 | Frank | 74/866 X |
| 4,459,879 | 7/1984 | Miki et al. | 74/866 X |
| 4,475,416 | 10/1984 | Underwood | 74/868 |
| 4,522,086 | 6/1985 | Haley | 74/867 |

FOREIGN PATENT DOCUMENTS 57-37146  3/1982  Japan .................................... 74/865

*Primary Examiner*—Leslie A. Braun
*Assistant Examiner*—Joseph M. Rolnicki
*Attorney, Agent, or Firm*—Pahl, Lorusso & Loud

[57] ABSTRACT

A stepless automatic transmission for a motor vehicle includes a V-belt type stepless transmission mechanism having input and output pulleys mounted respectively on input and output shafts, each pulley being provided with a hydraulic servo for varying the effective diameter thereof, and a V-belt linking the input and output pulleys to transmit power therebetween, in combination with a forward/reverse change-over mechanism and a coupler such as a fluid coupling, centrifugal clutch or friction clutch, and a hydraulic control system. The hydraulic control system includes a primary regulator valve for generating a primary line pressure by regulating pressurized oil from a pressure source responsive to one or more operating conditions of a vehicle such as vehicle speed and/or throttle opening and a secondary regulator valve for generating a secondary line pressure at a lower level than said primary line pressure by regulating pressurized oil from a pressure source responsive to one or more operating conditions of the vehicle. The V-belt type stepless transmission is characterized by input and output pulley hydraulic servos with substantially equal effective pressure receiving areas. The hydraulic control system is arranged to control the hydraulic servo of the input pulley by either supplying primary line pressure or by bleeding pressure therefrom and includes a shift sequence mechanism adapted to supply the secondary line pressure to the hydraulic servo of the output pulley when the hydraulic servo of the input pulley is supplied with fluid pressure higher than a preset value in normal and upshift operations of the vehicle, and to supply the primary line pressure to the hydraulic servo of the output pulley when the hydraulic servo of the input pulley is supplied with oil pressure lower than a preset value in downshifting the vehicle.

15 Claims, 12 Drawing Figures

STEPLESS AUTOMATIC TRANSMISSION FOR MOTOR VEHICLES

BACKGROUND OF THE INVENTION

1. Field of the Invention

This invention relates to a stepless automatic transmission for motor vehicles, of the type employing a V-belt type stepless mechanism.

2. Description of the Prior Art

Conventional stepless automatic transmission employ a V-belt type stepless transmission mechanism including input and output pulleys, each with a variable effective diameter under control of a hydraulic servo, and a V-belt linking the input and output pulleys. Such a V-belt type stepless transmission mechanism is usually used in combination with a forward/reverse switch mechanism and a coupler such as a fluid coupling, centrifugal clutch or friction clutch. With this conventional type of V-belt type stepless transmission mechanism, in order to ensure quick and smooth increases and decreases in reduction ratio, it is necessary to hold at about 2 the load ratio of the input pulley to the output pulley. The approach which has thus far been resorted to for securing that load ratio is to make the effective pressure receiving area of a hydraulic servo of the input pulley about two times greater than that of the output pulley for the purpose of equalizing the operating pressures of the hydraulic servos of the input and output pulleys. However, the hydraulic servo of the input pulley, with such a large effective pressure receiving area, is found to be so bulky as to present problems with regard to mounting within the limited space available on the vehicle and will naturally invite a reduction in mileage due to its increased weight.

SUMMARY OF THE INVENTION

It is an object of the present invention to provide a stepless automatic transmission for motor vehicles, employing a V-belts type stepless transmission mechanism in which the effective pressure receiving area of the hydraulic servo on the input pulley is substantially the same as that of the hydraulic servo on the output pulley.

It is another object of the present invention to provide such a transmission mechanism of compact construction and reduced weight.

According to the present invention, there is provided a stepless automatic transmission, including a V-belt type stepless transmission mechanism having input and output pulleys mounted respectively on input and output shafts, each pulley being provided with a hydraulic servo for varying the effective diameter thereof, and a V-belt linking the input and output pulleys to transmit power therebetween, in combination with a forward-/reverse change-over mechanism and a coupler such as a fluid coupling, centrifugal clutch or friction clutch. The present invention further provides a hydraulic control system including a primary regulator valve for generating a primary line pressure by regulating pressurized oil from a pressure source responsive to changes in one or more operating conditions of the vehicle such as vehicle speed and throttle opening and a secondary regulator valve for generating a secondary line pressure at a lower level than the primary line pressure by regulating pressurized oil from a pressure source, also responsive to changes in one or more operating conditions of the vehicle.

The V-belt type stepless transmission mechanism is characterized in part by substantially equal pressure receiving areas in the hydraulic servos of the input and output pulleys.

The hydraulic control system is arranged to control the hydraulic servo of the input pulley by supply of the primary line pressure thereto and drainage of oil pressure therefrom. The hydraulic control system is provided with a shift sequence mechanism adapted to supply the secondary line pressure to the hydraulic servo of the output pulley when the hydraulic servo of the input pulley is supplied with oil pressure higher than a predetermined value in normal and upshift operations of the vehicle and to supply the primary line pressure to the hydraulic servo of the output pulley when the hydraulic servo of the input pulley is supplied with oil pressure lower than a predetermined value in downshift operation of the vehicle.

The above and other objects, features and advantages of the present invention will become apparent from the following description and appended claims, taken in conjunction with the accompanying drawings which show by way of example a preferred embodiment of the invention.

BRIEF DESCRIPTION OF THE DRAWINGS

In the accompanying drawings

DESCRIPTION OF THE PREFERRED EMBODIMENTS

Figure 1:
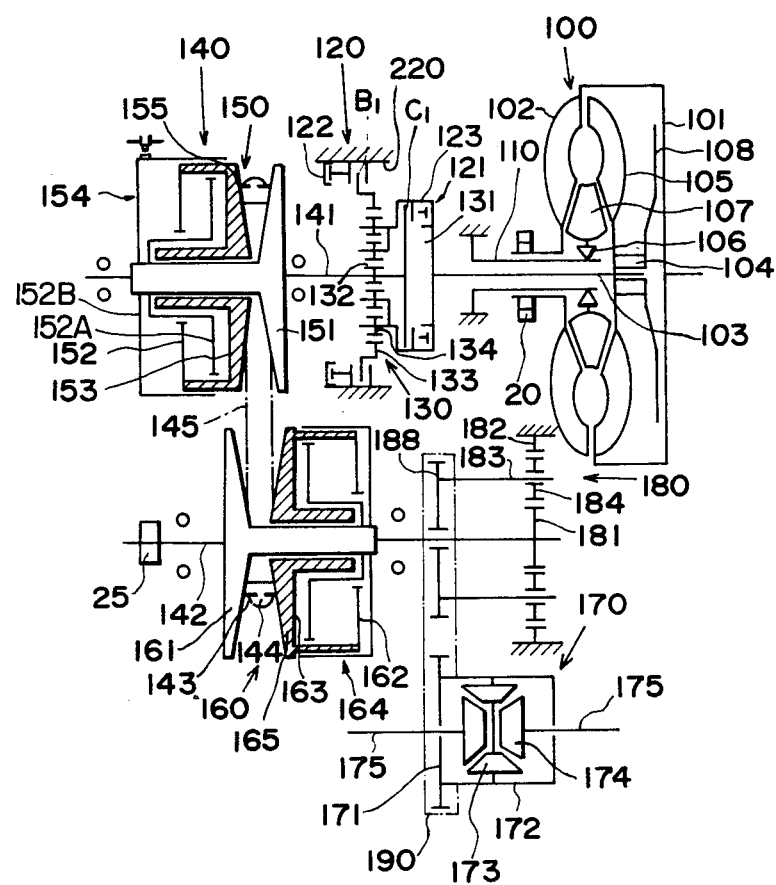
FIG. 1 is a skeletal illustration of a stepless automatic transmission in accordance with the present invention.

Referring to the accompanying drawings and first to FIG. 1, there is shown a vehicular stepless automatic transmission embodying the present invention, which includes a fluid type torque converter 100 serving as a fluid joint with a direct-coupling clutch, a planetary gear mechanism 120 for shifting the transmission to either a forward or a reverse position, a V-belt type stepless transmission mechanism 140, and a differential gear mechanism 170.

The torque converter 100 includes: a front cover 101 coupled to an output shaft of an engine (not shown); a pump impeller shell 102 welded to the front cover 101 and provided with impellers on the inner periphery thereof; a turbine runner 105 having its center portion coupled to an output shaft 103 of the torque converter through a turbine hub 104; a stator 107 fixed to an inner casing 110 through a one-way clutch 106; and a direct-coupling clutch 108 for directly coupling the turbine hub 104 to the front cover 101. Provided between the torque converter 100 and the planetary gear mechanism 120 is an oil pump 20 which is driven by the output of the engine.

The planetary gear mechanism 120 serving as a forward/reverse shifter includes: an input shaft 103 which is the output shaft 103 of the torque converter; an output shaft 141 which forms the input shaft 141 of the V-belt type stepless transmission mechanism and which is connected in series with the input shaft 103; a multiple disc clutch C1; a hydraulic servo 121 for operating the multiple disc clutch C1; a multiple disc brake B1; a hydraulic servo 122 for operating the multiple disc brake B1; and a planetary gear set 130. The planetary gear set 130 includes: a carrier 131 connected to the input shaft 103 through an annular hydraulic cylinder 123 of the hydraulic servo 121; a sun gear 132 connected to the hydraulic cylinder 123 through the multiple disc clutch C1 and splined on the output shaft 141; a ring gear 133 fixed to a transmission case 220 through the multiple disc brake B1; and a planetary gear 134 rotatably supported by the carrier 131 and meshed with the sun gear 132 and ring gear 133.

The V-belt type stepless transmission mechanism includes: an input shaft 141; an output shaft 142 disposed parallel to the input shaft 141; an input pulley 150 and an output pulley 160 mounted on the input and output shafts 141 and 142, respectively, and each driven by a hydraulic servo; and a V-belt 145, linking the input and output pulleys 150 and 160, in the form of a steel band 143 formed of overlapping, thin loop-like sheets and a number of metal blocks (teeth) 144 attached to the steel band 143. The input pulley 150 is provided with a stationary flange 151 which is formed integrally with the input shaft 141, and a movable flange 155 which is axially displaceable when driven by the input pulley hydraulic servo 154 with double pistons 152 and 153, for enlarging or reducing the effective diameter of the input pulley. In the double piston arrangement the sum of the doughnut-shaped (annular) area of 152 (vertical in the drawing) facing cover plate 152B plus the doughnut-shaped area of 152A (vertical in the drawing) facing 153 constitutes the effective pressure receiving area of hydraulic servo 154. The output pulley 160 is provided with a stationary flange 161 which is formed integrally with the output shaft 142, and a movable flange 165 which is axially displaceable by the output pulley hydraulic servo 164 with operation of double pistons 162 and 163. The effective pressure receiving area of hydraulic servo 164 consists of the sum of the doughnut-shaped (vertical) area of 162 facing cover plate 162B plus the doughnut-shaped (vertical) area of 162A facing 163.

The differential gear mechanism 170 includes: a large drive gear 171 serving as an input gear; a gear box 172; a small differential gear 173; a large differential gear 174; and an output shaft 175 connected to a wheel axle.

A governor valve 25 is mounted at one end of the output shaft 142 of the V-belt type stepless transmission, and an output gear 188 is rotatably supported at the other end of the output shaft, together with a reducing planetary gear set 180. The reducing planetary gear set 180 includes: a sun gear 181 mounted on the output shaft 142; a ring gear 182 fixed to the transmission case 220, a carrier 183 coupled to the output gear 188; and a planetary gear 184 rotatably supported by the carrier 183 and meshed with the sun gear 181 and the ring gear 182. The output gear 188 is connected to the large drive gear 171 of the differential gear mechanism by a chain 190.

THE HYDRAULIC CONTROL SYSTEM

Figure 2:
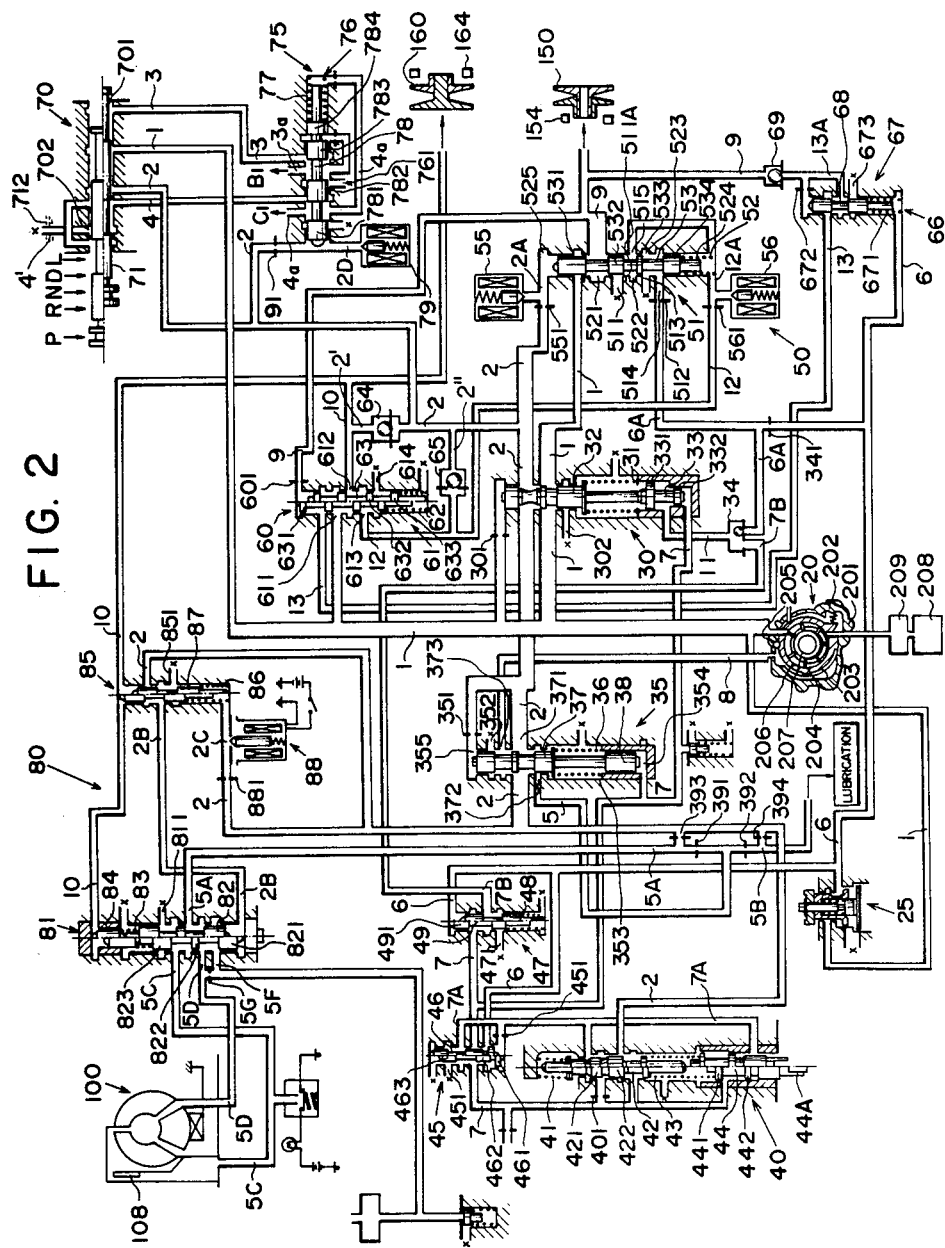
FIG. 2 is a circuit diagram of a hydraulic control system for the transmission of FIG. 1.

FIG. 2 illustrates a hydraulic control system for controlling operation of the vehicular stepless automatic transmission of FIG. 1 responsive to changes in operating conditions of the vehicle, and which consists of an electronic control system which, at its input terminals, receives signals indicative of operating conditions of vehicle and a hydraulic control system which is controlled by the electronic control system.

In the particular embodiment shown in FIG. 2, the hydraulic control system includes: the aforementioned pump 20 serving as a pressure source and driven from the engine; the governor valve 25 adapted to produce governor pressure commensurate with the vehicle speed or the rotational speed of the output shaft 142 of the V-belt type stepless transmission mechanism; a primary regulator valve 30 for supplying primary line pressure to the hydraulic control system; a secondary regulator valve 35 for supplying secondary line pressure to the hydraulic control system; a throttle valve 40 adapted to produce throttle pressure relative to the throttle opening; a cutback valve 45 supplying the throttle valve with cutback pressure corresponding to the governor pressure to correlate the throttle pressure with the vehicle speed (or governor pressure); a line pressure regulator valve 47 for supplying the primary regulator valve with throttle control pressure which has been regulated in relation to the governor pressure; a reduction ratio control mechanism 50 for controlling the supply and discharge of the oil (hydraulic fluid) to and from the hydraulic servo of the input pulley responsive to the operating conditions of the vehicle for increasing or reducing the reduction ratio; a shift sequence mechanism 60 for changing the oil pressure supplied to the hydraulic servo of the output pulley of the V-belt type stepless transmission mechanism from the primary to secondary line pressure in correlation with the operation of the reduction ratio control mechanism 50; an input pulley modulator mechanism 66 for balancing the oil pressure of the hydraulic servo of the input pulley during constant speed (normal) operation, compensating for leakage of oil pressure from the hydraulic servo; a manual valve operated by a shift lever provided adjacent the driver's seat to shift the planetary gear mechanism 120 between forward and reverse positions; a shift control mechanism 75 for smoothening the engagement of a multiple disc clutch or brake upon shifting from neutral to drive (N→D) or from neutral to reverse (N→R) and for performing inertial cruising in drive (D-range); and a lock-up control mechanism 80 for operating the direct-coupling clutch 100 of the torque converter.

The oil pump 20 is a variable volume type vane pump including a casing 204 pivotally mounted in a housing 201 about a fulcrum point 205 for sliding movement relative to the axis of a rotor 207 mounted within casing 204. Casing 204 is biased toward one side of housing 201 by a spring 202 and forms a hydraulic servo 203 on the other side. The rotor 207 carries vanes 206 as is conventional. The oil pump 20 draws oil from an oil reservoir 208 through a suction conduit 1 and an oil strainer 209.

Primary Line Pressure

Figure 3:
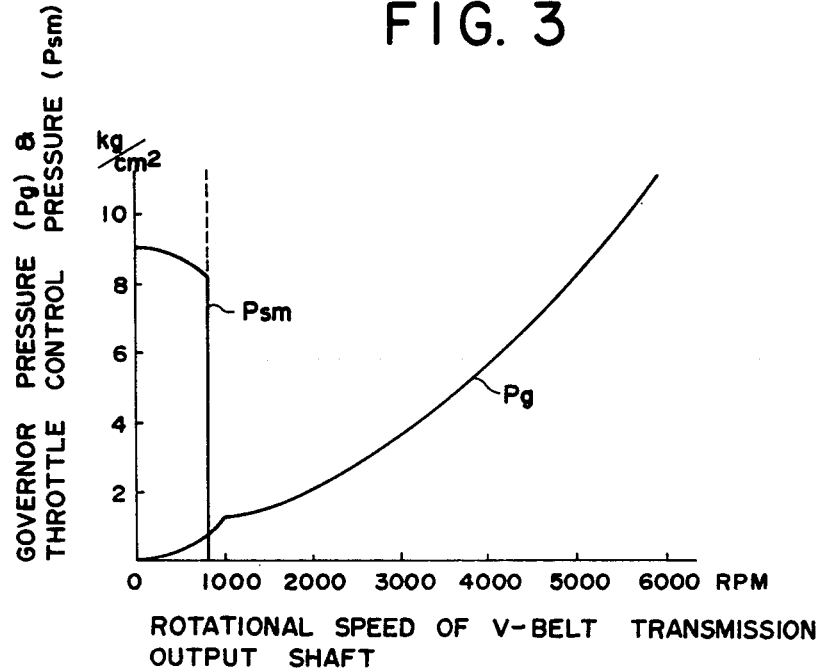
FIG. 3 is a graph plotting governor pressure as regulated by the governor valve of the hydraulic control system and throttle control pressure as regulated by the line pressure regulator valve versus the rotational speed of the output shaft.

The governor valve 25 is of a known construction and is mounted on the output shaft 142 of the V-belt type stepless transmission assembly. Governor valve 25 regulates the line pressure which is supplied through a conduit 1, responsive to the rotational speed of the V-belt stepless transmission output shaft 142 (corresponding to the vehicle speed), to provide a regulated pressure conduit 6, as illustrated in FIG. 3.

Figure 4:
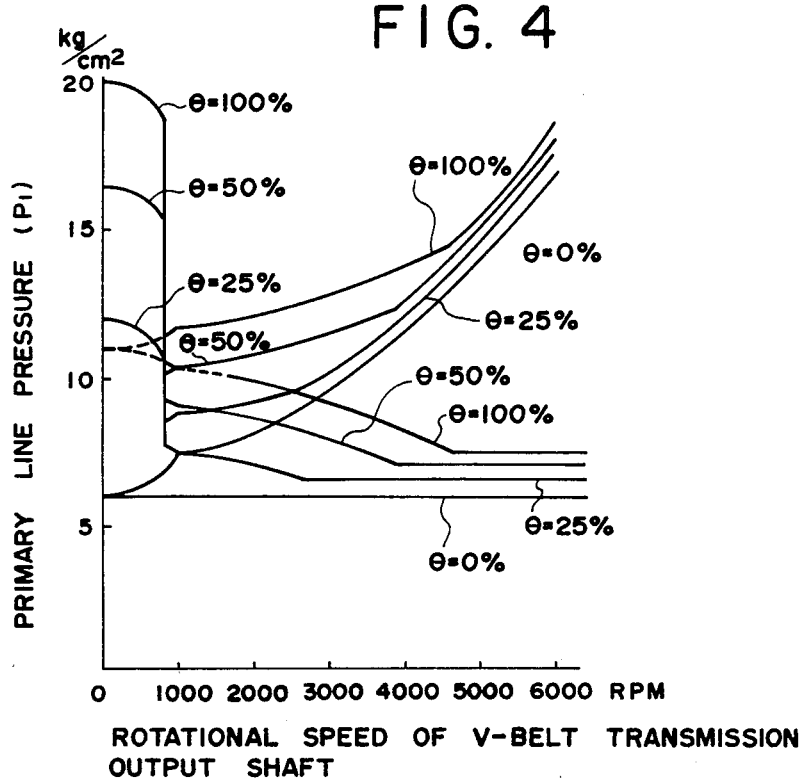
FIG. 4 is a graph plotting primary line pressure, as regulated by the hydraulic control system for the stepless automatic transmission according to the present invention, versus the rotational speed of the output shaft.

The primary regulator valve 30 includes a spool 32 which is engaged by a biasing (compression) spring 31 on one side (the bottom side in the drawing) and a regulator plunger 33 which is disposed in series with and abuts against the lower end of the spool 32. The regulator plunger 33 carries an upper land 331 of a relatively large diameter and a lower land 332 of a relatively smaller diameter. The effective pressure receiving area of the upper land 331 receives either (1) the throttle control pressure supplied from the line pressure regulator valve 47 through conduit 7B via check valve 34 and conduit 11, or (2) the governor pressure supplied from the conduit 6A which is in communication with the conduit 6 through an orifice 341. The lower land 332 of smaller diameter receives the throttle pressure through conduit 7, tending to push the spool 32 upward. The spool 32 is displaced by feedback of the primary line pressure applied from above to a land 332' on its upper surface through orifice 301, by the force of the spring 31 and by the force of the regulator plunger 33, thus varying the area of communication between conduits 1 and 2 to relieve excess oil pressure through conduit 2 while draining through a drain port 302 the amount of oil which exceeds the discharge capacity of the conduit 2. As a result, oil pressure in the conduit 1 is regulated at primary line pressure P1 responsive to changes in the rotational speed of output shaft 142 which, in turn, is related to certain operating conditions of the vehicle, namely, to the vehicle speed (governor pressure) and throttle opening (throttle pressure), as shown in FIG. 4.

Secondary Line Pressure

The secondary regulator valve 35 includes a spool 37 and a spring 36 which engages one side of the spool 37 (the lower side in the drawing) and biases the spool 37; (upwardly in the drawing). A plunger 38 is located beneath the spool 37 in series with it and abuts the lower end of the spool 37. The spool 37 receives secondary line oil for regulation through a first port 371 and excess oil resulting from regulation of the secondary line pressure passes through a second port 372 to those parts of the torque converter 100 and automatic transmission which need lubrication. Oil at a pressure controlling the amount of oil delivery by the variable volume type oil pump 20 is supplied by valve 35 through a third port 373. Valve 35 is further provided with drain ports 352 and 353, an input port 354 for receiving the throttle pressure responsive to the operating condition of the vehicle, and an input port 355 for receiving the secondary line pressure feedback.

The conduit 5 which communicates with valve 35 through the second port 372 also communicates, through an orifice 391 of a relatively large diameter, with a conduit 5A which supplies operating oil to the torque converter 100 through the lock-up valve 81 of the torque converter. Conduit 5 also serves to supply lubricating oil to conduit 5B, through an orifice 392 of a medium diameter for lubrication of various parts of the automatic transmission.

The conduit 2 containing oil at the secondary line pressure communicates with the lock-up control valve 81 through conduit 5A provided with an orifice 393 of a small diameter, and also communicates with the lubricant oil supply conduit 5B through an orifice 394 of a small diameter.

Figure 5:
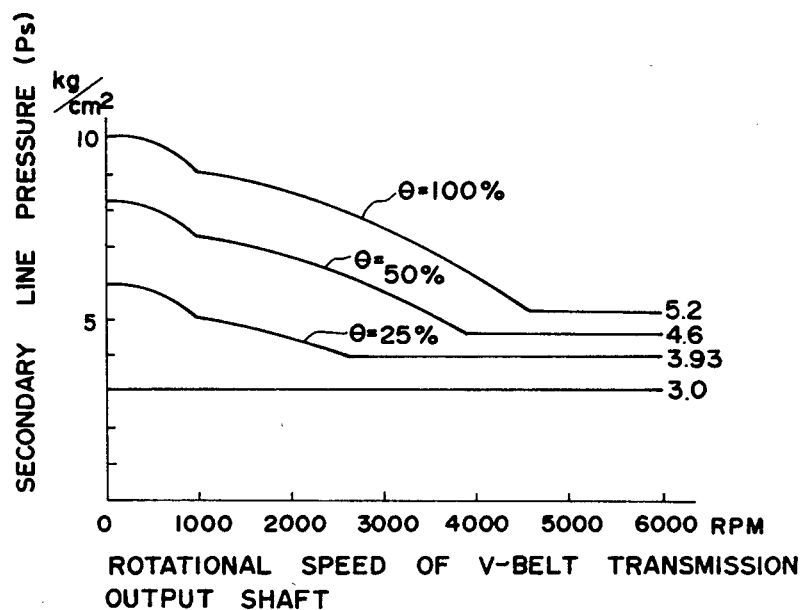
FIG. 5 is a graph plotting secondary line pressure, as regulated by the hydraulic control system of the present invention, versus the rotational speed of the output shaft.

The secondary regulator valve operates in the following manner. The spool 37 of the second regulator valve 35 is displaced by the feedback of secondary line pressure from conduit 2, which feedback is received through orifice 351 by land 37A (at its upper end in the drawing), by the force of the spring 36 and by throttle pressure which is applied to the plunger 38 through conduit 7, thereby varying the area of communication between the first and second ports 371 and 372 which are in communication with the secondary line pressure conduit 2 and the lubricant oil supplying conduit 5, respectively. In this manner the input throttle pressure serves to regulate the oil pressure (secondary line pressure) in the conduit 2 which is the conduit for receiving the excess oil resulting from the regulation of primary line pressure by the primary regulator valve 30, thus producing the secondary line pressure P as shown in FIG. 5. At the same time, the secondary regulator valve 35 adjusts the area of communication between third port 373, which is in communication with the conduit 8 which supplies controlled pressure to the hydraulic servo of the oil pump, and the first port 371 in communication with the conduit 2 and the drain port 352, thereby controlling the discharge capacity of the oil pump 20.

Figure 6:
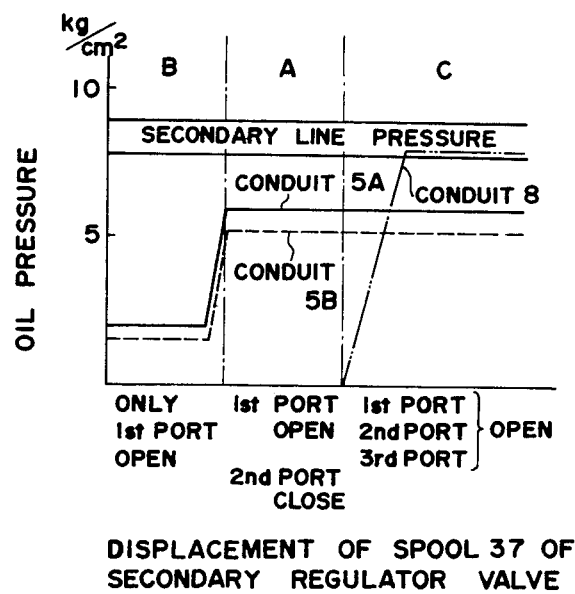
FIG. 6 is a graph plotting output oil pressures produced at various ports of the secondary regulator valve, versus displacement of the valve spool, under constant throttle pressure.

FIG. 6 shows the characteristics of oil pressure variations in conduits 5A, 5B and 8 in relation to displacement of the spool 37 under a constant throttle pressure. Operation when the secondary line pressure is in a predetermined appropriate range (in Zone A of FIG. 6).

The first and second ports 371 and 372 are in communication with each other and oil pressure is produced in the conduit 5 to supply oil through port 391 to the conduit 5A, which supplies oil to the torque converter, and through port 392 to the conduit 5B which supplies lubricant oil, maintaining appropriate oil pressures in these conduits.

Operation with the engine at low speed, with reduced oil delivery from the oil pump 20 and in the amount of excess oil discharged into conduit 2 from the primary regulator valve 30, and increased amounts of oil leakage at various parts of the hydraulic circuit due to high oil temperature, dropping the secondary line pressure below a predetermined appropriate range (Zone B of FIG. 6).

The spool 37 is displaced upward in the drawing and the second port 372 is closed to stop the discharge of excess oil from the conduit 5 to retain the secondary line pressure. At this time, if no pressurized oil is fed to the conduit 5A, it becomes difficult for the torque converter 100 to maintain the direct coupling clutch 108 fully released, causing abrasive wear of the direct coupling clutch by sliding contact and overheating of operating oil in the torque converter due to insufficient circulation. However, by the present invention, the amount of operating oil necessary to maintain the clutch 108 fully released is fed from conduit 2 to conduit 5A through the small diameter orifice 393, and from conduit 5A to the torque converter 100 through the direct coupling clutch control valve 81, to prevent sliding contact in the direct coupling clutch and overheating of the operating oil. Further, if no lubricating oil is fed to the conduit 5B, there will occur seizures of sliding parts which need lubrication. Therefore, a necessary minimum amount of lubricating oil is fed through the small diameter orifice 394. Since the amount of oil which flows out of the conduit 2 through the orifices 393 and 394 is extremely small, it has almost no adverse affect on the retention of the secondary line pressure in the conduit 2.

Operation with the engine at high speed, with high oil delivery from the oil pump 20 and, as a result, with a large amount of excess oil discharge from the primary regulator valve 30 into the conduit 2 (Zone C of FIG. 6).

The secondary line pressure is elevated above a given level of the spool 37 is displaced downward in the drawing and communication is established between the third port 373 and the first port 371, thereby supplying pressurized oil from conduit 8 to the hydraulic servo 203 of the oil pump 20 to reduce the amount of oil delivery from the oil pump 20. Consequently, the excess oil from the primary regulator valve 30 is reduced to lower the secondary line pressure to a predetermined appropriate range. The output torque of the engine which is consumed by the oil pump 20 is reduced by reduction of the oil delivery from the pump, thereby increasing the available output torque of the engine and improving its fuel cost.

Under these conditions, the secondary line pressure is approximately ½ of the primary regulator pressure which is produced in the conduit 1 by the primary regulator valve 30.

Throttle Valve

Figure 7:
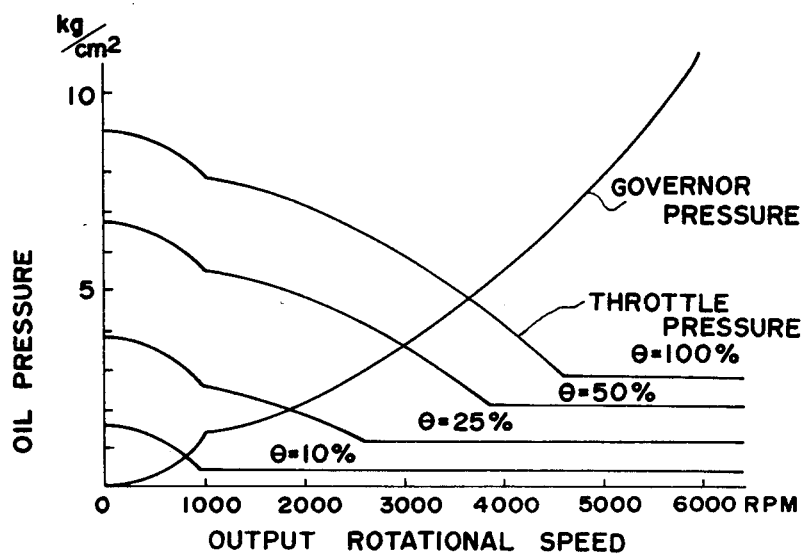
FIG. 7 is a graph plotting throttle pressure, as regulated by the throttle valve, versus rotational speed of the output shaft.

The throttle valve 40 includes a spool 42 biased (downwardly in the drawing) by spring 41 which engages it at one end (the upper end in the drawing), and a throttle plunger 44 arranged coaxially with the spool 42 in the same bore (beneath spool 42 in the drawing). One end of the plunger 44 is operatively connected to the spool 42 through a spring 43 and the opposite end 44A of plunger 44 abutts an operating surface of a throttle cam (not shown) which is rotated at a speed varying with the throttle opening of the engine. The throttle plunger 44 is provided with a land 441 of a larger diameter (the upper land in the drawing) and a land 442 of a smaller diameter (the lower land in the drawing), and displaced (upwardly in the drawing) by the throttle pressure in conduit 7 which is applied to the effective pressure receiving area of the larger land 441. The spool 42 is also lifted by the force of the throttle cam and by the cutback pressure within conduit 7A which is applied to the effective pressure receiving area of the smaller land 442 on its lower side, pressing the spool 42 upward through the spring 43. Thus, the spool 42 is positioned by (1) the force from beneath exerted by the spring 43, (2) the force from above exerted by the spring 41, (3) the cutback pressure within conduit 7A acting on the effective pressure receiving area of the upper land 421, and (4) feedback of the throttle pressure applied to the effective pressure receiving area of an intermediate land 422 through orifice 401. A change in any of those applied forces will displace spool 42 and change the area of communication between conduits 2 and 7 to regulate the secondary line pressure in conduit 2. In this manner a throttle pressure is established in conduit 2 which varies responsive to changes in the throttle opening and the governor pressure (rotational speed of the output shaft) as shown in FIG. 7.

Cutback Valve

Figure 8:
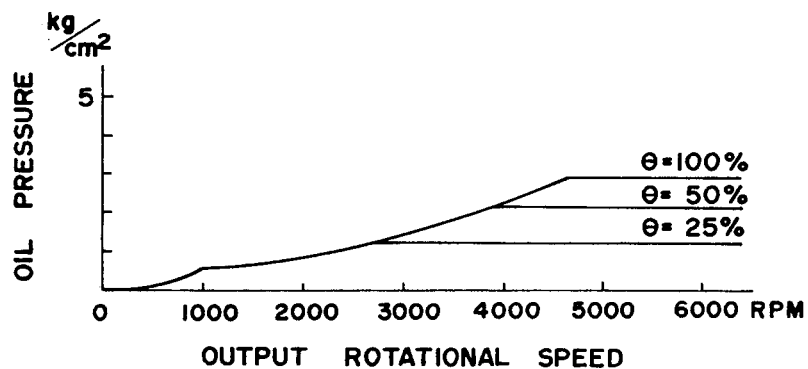
FIG. 8 is a graph plotting cutback pressure, versus output shaft rotational speed.

The cutback valve 45 includes a spool 46 having a land 461 of a large diameter provided at the lower end thereof, an intermediate land 462 and an upper land 463. Cutback valve 45 controls communication between the conduits 7 and 7A to produce a cutback pressure Pc in the conduit 7A when the spool 46 is held in the lower position shown in the drawing. The spool 46 is displaced by the effects of the downwardly acting governor pressure Pg which is applied from above through the conduit 6 on the effective pressure receiving area S1 upper surface of the land 461 and the upwardly acting cutback pressure Pc which is applied from beneath through orifice 451 on another (lower) effective pressure receiving area S2 of the lower land 461, taking a position of equilibrium expressed by an equation $Pg \times S1 = Pc \times S2$. As the spool 46 is displaced upward, the area of communication between the conduits 7A and 7 is reduced, increasing the area of communication between the conduit 7A and the drain port 451, so that the cutback pressure Pc drops to render $Pg \times S1 > Pc \times S2$, displacing the spool 46 downward. In this manner, the spool 46 is retained in a position which is defined by the formula of equilibrium $Pg \times S1 = Pc \times S2$, to regulate the cutback pressure within the conduit 7A. Changes in the cutback pressure Pc responsive to changes in the rotational speed of output shaft 142 are shown in FIG. 8.

Line Pressure Regulator Valve

The line pressure regulator valve 47 is provided with a spool 49 which is biased from one end (the lower end in the drawing) by spring 48. The spool 49 is displaced by the effects of the load (from beneath) of spring 48 and the governor pressure Pg which is applied from above through conduit 6 on the land 491 to adjust the area of communication between (1) the output throttle pressure conduit 7B and the conduit 7 which supplies the throttle pressure and (2) between conduit 7B and the drain port 471, thereby regulating the output throttle pressure in the conduit 7B. Characteristics of the throttle pressure Psm are shown in FIG. 3.

Reduction Ratio Control Mechanism

The reduction ratio control mechanism 50 includes a reduction ratio control valve 51 which changes the reduction ratio of the V-belt stepless transmission 140 by controlling the communication between the hydraulic servo 154 of the input pulley 150 and the drain port 511. The reduction ratio control mechanism 50 further includes an electromagnetic solenoid valve 55 for upshift (hereinafter referred to as "upshift valve" for brevity) and an electromagnetic solenoid valve 56 for downshift (hereinafter referred to as "downshift valve" for brevity) which controls the reduction ratio control valve 51 and are energized and de-energized by the electronic control system responsive to various operating conditions of the vehicle such as the rotational speed of the input pulley and the throttle opening. The reduction ratio control valve 51 is provided with a spool 53 which is biased from one end (the lower end in the drawing) by spring 52. The spool 53 carries intermediate lands 532 and 533 between an upper land 531 provided at its upper end and a lower land 534 provided at its lower end which engages upper end of the spring 52. An oil chamber 521 is provided between the lands 531 and 532 and is in communication with the conduit 9, with the conduit 1 when the spool 53 is displaced upward and with the drain port 511 when the spool 53 is displaced downward. An oil chamber 522 between the intermediate lands 532 and 533 is in communication with conduit 12A which communicates with a lower oil chamber 524. Oil pressure from conduit 12A will leak through chamber 522 out the drain port 511 whose access opening is adjusted by the position of the land 532, thereby regulating the pressure to retain the spool in an intermediate position. The drain port 511 is provided with a notch 511A to vary gradually the amount of oil leakage from the conduit 12A and to smooth the adjustments necessary to hold the spool in the intermediate position. An oil chamber 523 between the intermediate land 533 and lower land 534 is in communication with conduit 6A through orifice 512. When the spool 53 is held in the intermediate position, the conduit 6A communicates with the drain port 513 to drain the pressure from conduit 6A. When the spool 53 is displaced upward, a port 514 for the conduit 6A is blocked by the lower land 534 to retain the pressure in conduit 6A, while at the same time communication is established between port 515 for the conduit 12A (in communication with a lower oil chamber 524) and the drain port 513 to drain the conduit 12A. The upshift solenoid valve 55 is supplied with the secondary line pressure from the conduit 2 through orifice 551, and is mounted on conduit 2A which is in communication with upper oil chamber 525 of the reduction ratio control valve 51, holding the oil pressure in conduit 2A at a high level (equivalent to the secondary line pressure) in its OFF state and draining the pressure from conduit 2A in its ON state. The downshift solenoid valve 56 is in communication with conduit 12 through orifice 561 and with the lower oil chamber 524 of the reduction ratio control valve 51, and is mounted on the conduit 12A leading to the port 515 which communicates with the oil chamber 522 when the spool 53 is in the intermediate position, retaining the pressure in conduit 12A in OFF state and draining conduit 12A in ON state.

Regulation of the Primary Line Pressure in Conduit 1

With the above-described construction, the primary line pressure in conduit 1 is controlled in the following manner.

If an upshift or downshift signal is received from the electronic control system responsive to a change in the operation of the vehicle, such as a change in the rotational speed of the input pulley or in the throttle opening, the upshift solenoid valve 55 or downshift solenoid valve 56 is energized, displacing the spool 53 of the reduction ratio control valve 51 upward or downward from its intermediate position. As a result, the communication between conduit 6A and drain port 513 is blocked and the governor pressure is produced as a shift signal in the conduit 6A, which was drained by communication with the drain port 513 when the spool 53 was in the intermediate position. The governor pressure in the conduit 6A is applied as a shift signal to the upper land 331 of the regulator plunger 33 through check valve 34 and conduit 11, pushing the spool 32 upward. The area of communication between the conduits 1 and 2 at the regulator valve 30 is reduced by the oil pressure of this shift signal. Therefore, the line pressure which is controlled by the regulator valve 30 is raised to a higher level as indicated by broken line in FIG. 4.

In this manner, the hydraulic servo of the input pulley is controlled by low line pressure under normal cruising operation. The level of the line pressure is raised only upon a change in torque ratio, controlling the reduction ratio by supplying the raised line pressure to the hydraulic servo of the input pulley at the time of an upshift and to the hydraulic servo of the output pulley at the time of a downshift. Consequently, it is possible to upshift or downshift the V-belt type stepless transmission quickly, with excellent acceleration and deceleration characteristics. Except for the upshift and downshift operations, the line pressure may be held at a low level to minimize the consumption of the engine output by the oil pump. In the particular embodiment shown, the governor pressure, which increases corresponding to increases in the vehicle speed or rotational speed of the output shaft 142 as shown in FIG. 3, is used as a shift signal pressure since the just-mentioned characteristics of the governor pressure are suitable for this purpose. However, it is to be understood that an oil pressure other than the governor pressure may be used as a shift signal if desired.

The Shift Sequence Mechanism

The shift sequence mechanism 60 includes a shift sequence valve 61 and check valves 64 and 65. The shift sequence valve 61 includes a spool 63 biased (upwardly in the drawing) by engagement of land 633, carried at one end (at the lower end in the drawing) by spring 62. Spool 63 is further provided with an upper land 631 and an intermediate land 632. Shift sequence valve 61 further includes a port 611 in communication with the conduit 1, a port 612 in communication with conduit 10 which supplies operating oil to the hydraulic servo 164 of the output pulley 160, a port 613 in communication with the conduit 12, and a drain port 614. The check valve 64 is inserted in a conduit 2' which connects the conduits 2 and 10 with each other, while the check valve 65 is inserted in a conduit 2" which connects the conduits 2 and 12 with each other.

Figure 9:
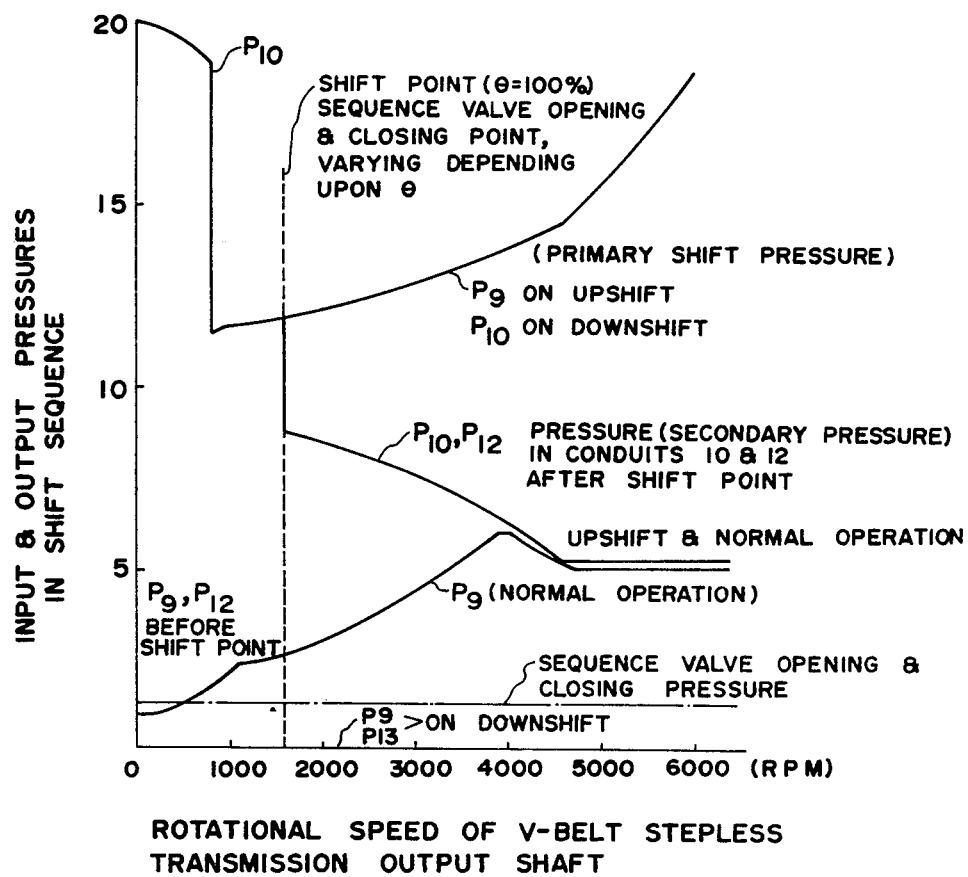
FIG. 9 is a graph plotting input pressures and output oil pressures for the shift sequence valve, versus output shaft rotational speed.

The spool 63 of the shift sequence valve 61 is displaced by the spring load which is applied from beneath by the spring 62 and by the oil pressure of conduit 9 which is applied to the upper land 631 from above through orifice 601. When the oil pressure in conduit 9 is higher than a predetermined value (i.e., in normal cruising operation or at the time of an upshift), spool 63 is held in its lower position where the conduits 12 and 10 communicate with each other, conduits 1 and 13 are in communication and communication between the conduits 1 and 10 is blocked. When the oil pressure is drained from conduit 9 (i.e., at the time of a downshift), the spool 63 is held in the upper position in the drawing where the conduits 1 and 10 are in communication, with each other conduit 12 is drained by communication with the drain port 614 and communication between the conduits 1 and 13 is blocked. The check valve 64 functions to supply the secondary line pressure in conduit 2 to conduits 10 and 12 when the spool 63 is held in the lower position in the drawing, while the check valve 65 discharges the oil pressure in conduit 12 into the conduit 2 when the oil pressure in conduit 12 becomes higher than that of conduit 2. Variations in the oil pressure P9 in conduit 9, corresponding to changes in the rotational speed of the output shaft 142, are shown in FIG. 9 along with corresponding variations in the oil pressure P10 in conduit 10 and oil pressure P12 in conduit 12.

The Input Pulley Modulator Mechanism

The input pulley modulator mechanism 66 includes a modulator valve 67 and a check valve 69. The modulator valve 67 is provided with a spool 68 which is biased (upward in the drawing) by spring 671 which engages its lower end. The check valve 69 is inserted between an output conduit 13A of the modulator valve 67 and an operating oil supply conduit 9 leading to the hydraulic servo 154 of the input pulley. The spool 68 of the modulator valve 67 is displaced by the effects of (1) the load of the spring 671 (2) the governor pressure in conduit 6 and (3) the feedback of the output oil pressure in conduit 13A which is applied to the upper land from the opposite direction through orifice 672. The net effect is regulation of the area of communication of the conduit 13A with the conduit 13 and drain port 673 to produce in conduit 13A a line modulator pressure Pm by modulating the line pressure from conduit 13 in relation to the governor pressure.

Figure 10:
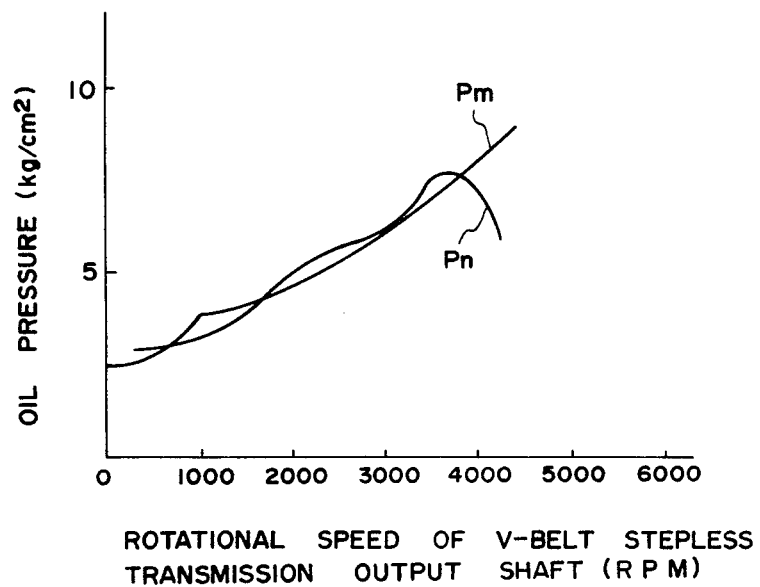
FIG. 10 is a graph plotting line modulator pressure Pm produced by the input pulley modulator valve and the oil pressure Pn necessary for the input pulley, versus the rotational speed of the output shaft.

FIG. 10 shows the line modulator pressure Pm along with a pressure Pn which is required by the hydraulic servo of the input pulley in normal cruising operation.

In order to maintain a normal cruising state with a conventional reduction ratio control mechanism, it is necessary to balance the belt gripping forces applied by the hydraulic servos of the input and output pulleys. To achieve such balance, it is necessary to supply a static oil pressure to the hydraulic servos of the input and output pulleys in order to maintain the tensile force of the V-belt which passes around the input and output pulleys, taking into account the oil pressure generated in the hydraulic servos by centrifugal force, thereby to balance the belt gripping forces. However, since the rotational speeds of the input and output pulleys vary according to the reduction ratio (or torque ratio), it has previously been necessary to balance the belt gripping forces by supplying or discharging operating oil to or from the hydraulic servo of the input pulley through operation of the reduction ratio control mechanism. Operation in that manner required solenoid valves to be turned on and off constantly even in ordinary cruising operation, which places a great burden on the solenoid valves and is detrimental to their durability.

However, in the present invention the input pulley modulator mechanism 66 determines the speed at which the driving engine power at a given throttle opening balances with normal cruising resistance and supplies the hydraulic servo of the input pulley with the pressure which is required in that state (i.e., in the normal state) to counterbalance the pressure of the hydraulic servo of the input pulley without intervention of the reduction ratio control mechanism. Thus, the present invention minimizes the number of on-off operations of the downshift and upshift solenoid valves which are operated by the reduction ratio control mechanism when maintaining normal operation or downshift as described hereinbefore.

Operation of the reduction ratio control mechanism 50, shift sequence mechanism 60, input pulley modulator mechanism 66 and primary regulator valve 30 of the pressure regulator.

A. Starting vehicle from neutral position.

The upshift and downshift solenoid valves 55 and 56 which are in OFF state when the manual valve is set in N-position. The downshift solenoid valve 56 is turned on for a short time period by the electronic control circuit upon receipt of an N-D shift signal, holding the spool 53 in the lower position in the drawing. As a result, the conduit 9 which supplies oil pressure to the hydraulic servo 154 of the input pulley is drained by communication with the drain port 511. As soon as the oil pressure in conduit 9 drops to a preset value, the spool 63 of the shift sequence valve 61 is displaced upward in the drawing by the action of the spring 62, bringing conduit 1 into communication with conduit 10 which supplies operating oil to the hydraulic servo 164 of the output pulley thereby supplying the primary line pressure to the conduit 10 and at the same time connecting conduit 12 with drain port 614 to bleed the pressure from conduit 12. Upon supplying the primary line pressure to conduit 10, the effective diameter of the output pulley is increased to a maximum value by its hydraulic servo, and, by the tensile force of the V-belt resulting from the increase in the effective diameter of the output pulley, the movable flange of the input pulley is pushed away from the stationary flange, thus reducing the effective diameter of the input pulley to a minimum value while accelerating bleeding of operating oil from the hydraulic servo 154. Simultaneously, the conduit 12A is drained by communication with the drain port 513, and, since conduit 12 is also drained, the drained state is retained irrespective of on-off operation of the downshift solenoid valve 56. The throttle control pressure in conduit 7B is applied to the regulator plunger 33 of the primary regulator valve 30 through conduit 11 to raise the primary line pressure to a high level. This elevated primary line pressure is supplied to the hydraulic servo 164 of the output pulley as described hereinbefore, so that the effective diameter of the output pulley is increased quickly with sufficient force for ensuring a smooth start.

B. Upshift after starting vehicle and quick upshift during cruising operation.

The upshift solenoid valve 55 is energized, and the downshift solenoid valve 56 is de-energized. As a result, the spool 53 of the reduction ratio control valve 51 is held in the upper position in the drawing, with conduit 9 in communication with conduit 1. With primary line pressure supplied to conduit 9, the spool 63 of the shift sequence valve 60 is displaced downward in the drawing to block communication between conduits 10 and 1, and bringing conduit 10 into communication with conduit 12. Therefore, the secondary line pressure in conduit 2 is supplied to conduit 10 through check valve 64. The hydraulic servo 154 of the input pulley 150, which is supplied with the primary line pressure from conduit 9, receives a greater load than the hydraulic servo 164 of the output pulley which is supplied with the secondary line pressure from conduit 10, so that the effective diameter of the input pulley 150 is increased and that of the output pulley is decreased to effect an upshift. Since the secondary line pressure which is supplied to conduit 10 is led into conduit 12A through conduit 12, it is possible to control the oil pressure in conduit 12A by the downshift solenoid valve 56. Further, land 534 of the spool 53 which is held in the upper position in the drawing blocks communication between conduit 6A and drain port 513, thereby retaining the governor pressure in conduit 6A. The governor pressure in conduit 6A acts on the regulator plunger 33 of the primary regulator valve 30 to raise the primary line pressure to the upper level as shown in FIG. 4. The elevated primary line pressure is supplied to the hydraulic servo 154 of the input pulley 150, increasing its effective diameter quickly and with an increase in force as described hereinbefore to effect a prompt upshifting. Thus, the vehicular stepless automatic transmission is provided with excellent acceleration characteristics.

C. Normal cruising operation

Both the upshift solenoid valve 55 and downshift solenoid valve 56 are in the OFF position.

The spool 53 of the reduction ratio control valve 51 is held in the intermediate position, blocking conduit 9 from conduit 1 and drain port 511 to retain the oil pressure in conduit 9. Consequently, the spool 63 of the shift sequence valve 61 is held in the lower position in the drawing. In this state, in order to supplement for leaks of operating oil from conduit 9 or to cope with small variations (increases) in reduction ratio resulting from increases in rotational speed of the output shaft, operating oil is fed from conduit 13A to conduit 9 by the input modulator valve through check valve 69, without resorting to on-off operations of the upshift and downshift solenoid valves 55 and 56. The life expectancy of the solenoid valves 55 and 56 is thus improved to a significant degree.

D. Normal upshift and slow upshift

The shiftup solenoid valve 55 is intermittently turned on and off by output signals of the electronic control system, so that the spool 53 of the reduction ratio control valve is vibrationally displaced upward to allow conduits 1 and 9 to communicate through a small area. Accordingly, the oil pressure in conduit 9 is elevated, and the hydraulic servo 154 of the input pulley which is in communication with conduit 9 increases the effective diameter of the input pulley according to the pressure of the operating oil with conduit 9 (supplied from conduit 1) to effect an upshift.

E. Normal downshift and slow downshift

The downshift solenoid valve 56 is intermittently turned on and off by output signals of the electronic control system, so that the spool 53 of the reduction ratio control valve is vibrationally displaced downward to bring the drain port 511 into communication with conduit 9 through a small area. As a result, the oil pressure in conduit 9 drops and the hydraulic servo 154 of the input pulley, which is in communication with conduit 9, reduces the effective diameter of the input pulley in proportion to the amount of operating oil drained from conduit 9 through 511 to effect a downshift.

F. Quick downshift

The upshift solenoid valve 55 is off, and the downshift solenoid valve 56 is on or off. Consequently, the spool 53 of the reduction ratio control valve 51 is held in the lower position in the drawing with communication established between conduit 9 and drain port 511. The pressure is thereby bled from conduit 9 and the spool 63 of the shift sequence valve 61 is held in the upper position in the drawing by the action of the spring 62, with conduit 10 in communication with conduit 1 to supply the primary line pressure to the hydraulic servo 164 of the output pulley, and with conduit 12 in communication with drain port 614 to bleed the pressure from conduit 12. The hydraulic servo of the output pulley 160, which is supplied with the primary line pressure, quickly increases the effective diameter of the output pulley, and, by the tensioning of the V-belt 145 caused by the increase of effective diameter of the output pulley, the movable flange of the input pulley is pushed aside to minimize the effective diameter of the input pulley while accelerating drainage of operating oil from the input hydraulic servo 154. At this time, the conduit 12A is drained by communication with drain port 513, so that the depressurized condition of 12A is continued irrespective of ON-OFF operation of the downshift solenoid valve 56. Further, the land 533 of spool 53 which is held in the lower position in the drawing blocks communication between conduit 6A and drain port 513, thereby retaining the governor pressure in conduit 6A and applying same to the regulator plunger 33 of the primary regulator valve 30 to raise the primary line pressure to an elevated level as shown in FIG. 4. The elevated primary line pressure is supplied to the hydraulic servo 164 of the output pulley 160 as described hereinbefore, increasing the effective diameter of the output pulley 160 quickly with a strong force to effect quick acceleration of the vehicle.

Manual Valve 70 and Shift Control Mechanism 75

The manual valve 70 is provided with a spool 71 which is manually displaced by a shift lever provided at the driver's seat and has shift positions for P (parking), R (reverse), N (neutral), D (forward) and L (low). In the respective shift positions, conduits 1 and 2 selectively communicate with conduits 3 and 4 to supply thereto either the primary line pressure or the secondary line pressure, or pressure may be bled from conduit 3 or 4 by communication with drain port 701 or 702, as shown in Table 1. The drain port 702, which serves to drain the pressure from conduit 4 (in communication with the clutch C1), leads to a conduit 4' which, in turn, leads to a point above the oil surface 712 to prevent lugging engagement of the clutch C1 which would otherwise be caused by residual oil in the hydraulic servo of the clutch C1.

TABLE 1

|  | P | R | N | D | L |
|---|---|---|---|---|---|
| Conduit 3 | X | O | X | X | X |
| Conduit 4 | X | X | X | Δ | Δ |

In Table 1, the Mark "O" indicates communication with conduit 1, the mark "Δ" indicates communication with conduit 2, and the mark "X" indicates a "drained" or depressurized state.

The shift control mechanism 75 includes a shift control valve 76, and a shift control electromagnetic solenoid valve 79 (hereinafter referred to as "shift solenoid valve" for brevity). The shift solenoid valve 79 is supplied with secondary line pressure from conduit 2 through orifice 91 in conduit 2D for controlling the latter according to output signals of the electronic control system. Conduit 2D is open to an oil chamber at the left end of the shift control valve 76. The shift control valve 76 includes a spool 78 which is biased by a spring 77 abutting a land 784 located at one end thereof (the right side in the drawing). The spool 78 is further provided with a land 781 formed at its opposite end (the left end in the drawing), an intermediate land 782, land 781 and 782 being somewhat larger than land 784. The spool 78 is positioned by the net effect of (1) the oil pressure in conduit 2D which is applied to the land 781 from the left, (2) the load of the spring 77 and (3) the feedback of the oil pressure acting on the effective pressure receiving area (cross-sectional area of land 783 minus the cross-sectional area of land 784) of the land 783 from pressure supply/drain conduit 3a for the hydraulic servo 122 of the brake B1 or the feedback of the oil pressure acting on the land 784 from pressure supply/drain conduit 4a for the hydraulic servo 121 of the clutch C1.

Operation by the manual valve 70 and shift control mechanism 75

A. When the manual valve is shifted from the N-Position (range) to D-range.

The conduit 3 is drained, and the secondary line pressure is supplied to conduit 4. In response to a N→D shift signal, the shift solenoid valve 79 which is the off state in N-range is turned on for a predetermined short time period, moving the spool 78 to the left position in the drawing. At this time, communication between conduits 4 and 4a is blocked, and the conduit 4a is drained by communication with drain port 761, so that the clutch C1 is in a released state. The length of the ON time of the on-off operation is gradually reduced by duty control, so that the oil pressure in conduit 2D is gradually elevated, displacing the spool 78 slowly rightward in the drawing to broaden the area of communication between conduits 4a and 4 while reducing the area of communication with the drain port 761 to let the oil pressure in conduit 4a smoothly approach the secondary line pressure. In this manner, the N→D shift is effected quite smoothly. Upon lapse of a predetermined time period, the shift solenoid valve 79 is turned off.

B. Shifting of the manual valve from N- to R-range

Conduit 3 is supplied with the primary line pressure, and conduit 4 is held in a depressurized state. In response to an N→R shift signal, the shift solenoid valve 79 which is in the off-state in N-range is put in on-off operating with the length of off-time gradually shortened by duty control, dropping the oil pressure in conduit 2D gradually. As a result, the spool 78 which has been held in the rightmost position in the drawing is slowly displaced leftward in the drawing, gradually decreasing the area of communication between conduit 3a and drain port 761 and gradually increasing the area of communication with conduit 3 to effect the N→R shift smoothly. Upon lapse of a predetermined time period, the shift solenoid valve 79 is turned on.

Conduit 2D is drained while the solenoid valve 77 is on, so that the spool 78 is held in the leftmost position in the drawing to allow conduits 3 and 3a to communicate with each other, thereby supplying pressurized oil to the hydraulic servo 122 for engaging the brake B1, and to allow conduit 4a to communicate with drain port 761 to release the clutch C1. Now, the planetary gear transmission mechanism 120 is put in reverse position. When the solenoid valve 79 is off, secondary line pressure exists in conduit 2D, and the spool 78 is held in the rightmost position in the drawing, with conduit 4 in communication with conduit 4a and conduit 3a in communication with drain port 761. As a consequence, the hydraulic servo 121 is supplied with pressurized oil and the hydraulic servo 122 is bled, engaging the clutch C1 and releasing the brake B1 to put the planetary gear mechanism 120 in forward position.

When the vehicle speed and throttle opening are smaller than predetermined values during cruising operating in D-range, the solenoid valve 79 is turned on by a signal from the electronic control system to release the clutch C1, thereby releasing the connection between the input and output shaft of the planetary gear mechanism to effect inertial operation for maximum mileage.

The Lock-Up Control Mechanism

The lock-up control mechanism 80 includes a lock-up control valve 81, a lock-up signal valve 85 and an electromagnetic solenoid valve 88 serving as an auxiliary lock-up device.

The lock-up control valve 81 is provided with a spool 82 which is located below a plunger 84 in the drawing, the plunger 84 being coaxially disposed in series with the spool 82 through a spring 83. The spool 82 is provided with a lower land 821, an intermediate land 822 and an upper land 823 of the same diameter. The O.D. of plunger 84 is greater than that of the lands of the spool 82.

The lock-up signal valve 85 includes a spool 87 which is biased in one direction (upwardly in the drawing) by spring 86 at one end and displaced, in that direction, by the load of the spring 86 and the oil pressure from conduit 2C in communication with conduit 2 through orifice 881 and, in the opposite direction (downwardly in the drawing), by the oil pressure from conduit 10. When held in the upper position in the drawing, the spool 87 allows communication between conduits 2 and 2B, and, when in the lower position in the drawing, it blocks communication between conduits 2B and 2 and allows communication of conduit 2B with drain port 851.

The electromagnetic solenoid valve 88 is provided in conduit 2C and, when energized, it bleeds the oil pressure from conduit 2C so that the spool 87 of the lock-up signal valve 85 is displaced in proportion to the oil pressure in conduit 10. When de-energized, it retains the oil pressure in conduit 2C to lock the spool 87 of the lock-up signal valve 85 in the upper position in the drawing.

Operation of the Lock-Up Control Mechanism 80

For generation of an input pressure signal for controlling release and engagement of the direct coupling clutch, the lock-up control valve 81 receives the secondary line pressure Ps on the pressure receiving surface (with a pressure receiving area L2) of the lower land 821 of the spool 82 through conduit 2, lock-up signal valve 85 and conduit 2B, which secondary line pressure is balanced against the oil pressure P10 of the hydraulic servo 164 of the output pulley received from conduit 10 on the pressure receiving surface (with a pressure receiving area L1) of the plunger 84.

(a) When the oil pressure P10 in the hydraulic servo 164 of the output pulley equals primary line pressure P1:

Since P10=P1, the pressure receiving surface areas of the spool 82 and plunger 84 of the lock-up control valve 81 are manufactured so that $P10.L1 > PS.L2$. Therefore, when the oil pressure P10 in conduit 10 is the primary line pressure P1, the spool 82 is fixed in a position (the lower position in the drawing) releasing the direct coupling clutch, establishing communication between conduits 5A and 5C and between conduits 50 and 5F irrespective of the input signal pressure (i.e., the secondary line pressure Ps). The operating oil therefore flows from conduit 2 to secondary regulator valve 35, conduit 5, conduit 5A, lock-up control valve 81, conduit 5F, conduit 50, lock-up control valve 81, conduit 5F and the oil cooler, holding the direct coupling clutch 108 in a released state.

Figure 11:
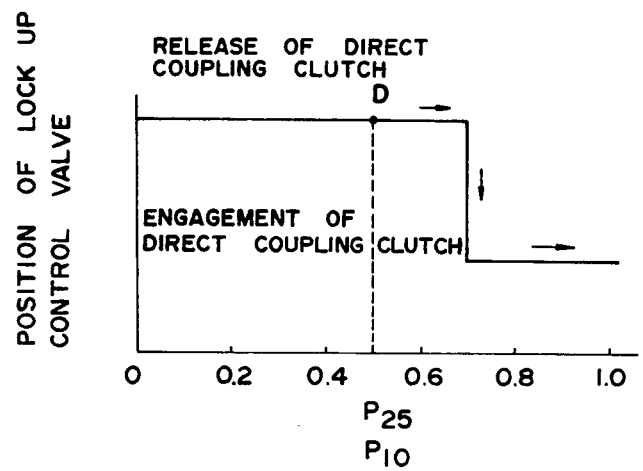
FIG. 11 is a graph showing displacement of the spool of the lock-up control valve in relation to input signal pressure P2B and opposing oil pressure P10 (the pressure within the output pulley hydraulic servo); and, FIG. 12 is a graph plotting input signal pressure P2B and opposing oil pressure P10 in the lock-up control valve versus vehicle speed.
Figure 12:
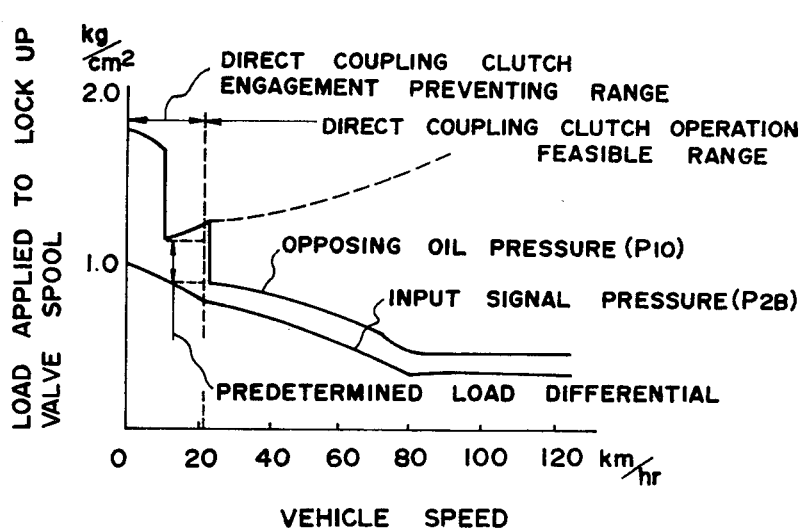

(b) When the oil pressure P10 in the hydraulic servo 164 of the output pulley is secondary line pressure:

Since P10=Ps and P10.L1<Ps.L2, the spool 82 is held in the upper position in the drawing (in position for engaging the direct coupling clutch), establishing communication between conduits 5A and 50 and between conduit 5C and drain port 811. Therefore, the operating oil flows from conduit 2 to secondary regulator valve 35, conduit 5, conduit 5A, lock-up control valve 81, conduit 50, conduit 5C and drain port 811 of the lock-up control valve, thereby effecting engagement of the lock-up clutch. In this connection, FIG. 11 shows the position of the spool of the lock-up control valve 81 in relation to oil pressure P2B in conduit 2B and oil pressure P10 in conduit 10, while FIG. 12 shows how P2B and P10 vary with vehicle speed.

Thus, the position of the lock-up signal valve 85 is determined by (1) the pressure P10 of conduit 10, i.e., the oil pressure of the hydraulic servo 164 of the output pulley, on the spool 87 with a pressure receiving area L, applied from above, and by (2), applied from beneath, the load SP2 of the spring 86 and the secondary line pressure Ps from conduit 2C in communication with conduit 2 through orifice 881.

(c) When the oil pressure P10 in conduit 10 equals primary line pressure P1:

Since the spring load is preset to establish the relationship of P10=P1 and P10.L>Ps.L+SP2, the spool 87 is held in the lower position in the drawing, placing conduit 2B in communication with drain port 851 to bleed conduit 2B. Consequently, the spool 82 of the lock-up control valve 81 is held in the lower position in the drawing, thus releasing the direct coupling clutch 108.

(d) When the oil pressure P10 in conduit 10 equals secondary line pressure Ps:

P10=Ps and P10.L<Ps.L+SP2, so that the spool 87 is held in the upper position in the drawing for engagement of the direct coupling clutch, allowing conduit 2B to communicate with conduit 2 to supply the secondary line pressure Ps thereto.

(e) When the lock-up solenoid 88 is on:

The spool 87 is held in the lower position in the drawing, irrespective of the oil pressure in conduit 10 as mentioned hereinbefore, the conduit 2B is drained, and no input signal pressure is supplied to the lock-up control valve 81 for releasing the direct coupling clutch 108. An orifice 5G is provided between conduits 5D and 5F for constantly supplying the oil cooler with operating oil in the minimum amount necessary to prevent overheating of the operating oil.

As is clear from the foregoing description, the present invention concerns a stepless automatic transmission for a motor vehicle, including a V-belt type stepless transmission mechanism having input and output pulleys mounted respectively on input and output shafts, each pulley being provided with a hydraulic servo for varying the effective diameter thereof, and a V-belt linking the input and output pulleys to transmit power therebetween, in combination with a forward/reverse changeover mechanism and a coupler such as a fluid coupling, centrifugal clutch or friction clutch, and a hydraulic control system. The hydraulic control system includes a primary regulator valve for producing a primary line pressure by regulating pressurized oil from a pressure source responsive to the operating conditions of the vehicle such as vehicle speed and throttle opening and a secondary regulator valve for producing a secondary line pressure at a lower level than the primary line pressure by regulating pressurized oil from a pressure source responsive to the operating conditions of the vehicle. The V-belt stepless transmission mechanism of the invention is characterized in part by substantially the same pressure receiving area in the hydraulic servos of the input and output pulleys. The hydraulic control system is arranged to control the hydraulic servo of the input pulley by supply of the primary line pressure and drainage of oil pressure therefrom and is provided with a shift sequence mechanism to supply secondary line pressure to the hydraulic servo of the output pulley when the hydraulic servo of the input pulley is supplied with oil pressure higher than a preset value in normal and upshift operations of the vehicle, and to supply primary line pressure to the hydraulic servo of the output pulley when the hydraulic servo of the input pulley is supplied with oil pressure lower than a preset value in downshift operation of the vehicle. Since the effective pressure receiving area of the hydraulic servo of the input pulley may be equivalent to that of the hydraulic servo of the output pulley, it becomes possible to provide a V-belt stepless transmission assembly of compact size and reduced weight.

The invention may be embodied in other specific forms without departing from the spirit or essential characteristics thereof. The above-described embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A stepless automatic transmission for a vehicle comprising:

(a) a V-belt stepless transmission mechanism comprising:

(i) an input pulley having a first axially stationary flange and first axially movable flange:

(ii) input pulley hydraulic servo means for receiving a first fluid pressure and for moving said first axially movable flange relative to said first axially stationary flange to vary the effective diameter of said input pulley responsive to changes in said first fluid pressure;

(iii) an output pulley having a second axially stationary flange and a second axially movable flange;

(iv) output pulley hydraulic servo means for receiving a second fluid pressure and for moving said second movable flange relative to said second stationary flange to vary the effective diameter of said output pulley responsive to changes in said second fluid pressure; and (v) a V-belt passing around said input and output pulleys for transmitting torque from said input pulley to said output pulley; and (b) a hydraulic control system comprising:

(i) reduction ratio control means for selectively supplying primary line pressure to said input pulley hydraulic servo or bleeding pressure therefrom, thereby varying the reduction ratio of said V-belt transmission mechanism;

(ii) a primary regulator valve for converting line pressure from a pressure source into said primary line pressure and for regulating said primary line pressure responsive to change in one or more operating conditions of the vehicle;

(iii) a secondary regulator valve for converting line pressure from a pressure source into secondary line pressure, lower than said primary line pressure, responsive to change in one or more operating conditions of the vehicle;

(iv) shift sequence means for supplying (1) secondary line pressure to said output pulley hydraulic servo when said input pulley hydraulic servo is supplied with fluid pressure higher than a predetermined value during normal and upshift operation of the vehicle and (2) primary line pressure to said output pulley hydraulic servo when said input pulley hydraulic servo is supplied with fluid pressure lower than the predetermined value during downshifting of the vehicle.

2. The stepless automatic transmission of claim 1, wherein the effective fluid pressure receiving area of said output pulley hydraulic servo is substantially equal to that of said input pulley hydraulic servo.

3. The stepless automatic transmission of claim 1, wherein said primary line pressure is regulated responsive to changes in vehicle speed.

4. The stepless automatic transmission of claim 1, wherein said primary line pressure is regulated responsive to changes in the throttle opening of the vehicle.

5. The stepless automatic transmission of claim 1, wherein said shift sequence means comprises a shift sequence valve having a spool shiftable, in response to an input fluid pressure corresponding to fluid pressure received by said input pulley hydraulic servo, between a first position allowing communication between a primary line pressure supply conduit and an operating fluid supply conduit for supplying fluid to said output pulley hydraulic servo, when said input fluid pressure is lower than a predetermined value, and a second position allowing communication between a secondary line pressure supply conduit and an operating fluid supply conduit for supplying fluid to said output pulley hydraulic servo, when said input oil pressure in higher than the predetermined value, while blocking said communication between said primary line pressure supply conduit and said output pulley hydraulic servo.

6. The stepless automatic transmission of claim 5, further comprising a first check valve inserted between said secondary line pressure supply conduit and said operating fluid supply conduit supplying said output pulley hydraulic servo.

7. The stepless automatic transmission of claim 6 further comprising:

a supply conduit for supplying the output pressure of said shift sequence valve to said reduction control means; and a second check valve inserted between said conduit for the output of said shift sequence valve and said secondary line pressure conduit.

8. The stepless automatic transmission of claim 1, further comprising an oil pump driven by the engine of the vehicle which serves as said pressure source for said primary regulator valve and wherein said pressure source for said secondary regulator valve is excess fluid resulting from said regulation of said primary line pressure.

9. The stepless automatic transmission of claim 1, further comprising a forward/reverse change-over mechanism for selectively shifting said V-belt stepless transmission between forward and reverse modes of operation.

10. A hydraulic control system for controlling a vehicular stepless automatic transmission responsive to changes in one or more operating conditions of a vehicle, the stepless automatic transmission employing a V-belt type stepless transmission mechanism including an input pulley and an output pulley mounted on an input shaft and an output shaft, respectively, each of the pulleys being provided with a hydraulic servo for varying the effective diameter thereof, and a V-belt linking the input and output pulleys to transmit power therebetween, said control system comprising:

a primary regulator valve for converting line pressure from a pressure source into a primary line pressure and for regulating said primary line pressure responsive to change in one or more operating conditions of the vehicle;

a secondary regulator valve for converting line pressure from a pressure source into secondary line pressure, lower than said primary line pressure, responsive to change in one or more operating conditions of the vehicle;

shift sequence means for supplying (1) secondary line pressure to said output pulley hydraulic servo when said input pulley hydraulic servo is supplied with fluid pressure higher than a predetermined value during normal and upshift operation of the vehicle and (2) primary line pressure to said output pulley hydraulic servo when said input pulley hydraulic servo is supplied with fluid pressure lower than a second predetermined value during downshifting of the vehicle;

reduction ratio control means for controlling supply of primary line pressure to the hydraulic servo of said input pulley and drainage of oil pressure therefrom, thereby varying the reduction ratio of said V-belt type transmission mechanism;

whereby said reduction ratio control means generates a shift pressure signal to said primary regulator valve at the time of shifting, and said primary regulator valve raising the primary line pressure to a higher level during shifting in response to the shift pressure signal.

11. The hydraulic control system of claim 10, wherein said primary line pressure is regulated responsive to changes in vehicle speed.

12. The hydraulic control system of claim 10, wherein said primary line pressure is regulated responsive to changes in the throttle opening of the vehicle.

13. The hydraulic control system of claim 10, wherein said shift sequence means comprises a shift sequence valve having a spool shiftable, in response to an input fluid pressure corresponding to fluid pressure received by said input pulley hydraulic servo, between a first position allowing communication between a primary line pressure supply conduit and an operating fluid supply conduit for supplying fluid to said output pulley hydraulic servo, when said input fluid pressure is lower than a predetermined value, and a second position allowing communication between a secondary line pressure supply conduit and an operating fluid supply conduit for supplying fluid to said output pulley hydraulic servo, when said input oil pressure is higher than the predetermined value, while blocking said communication between said primary line pressure supply conduit and said output pulley hydraulic servo.

14. The hydraulic control system of claim 13, further comprising a check valve inserted between said secondary line pressure supply conduit and said operating fluid supply conduit supplying said output pulley hydraulic servo.

15. The hydraulic control system of claim 10, further comprising an oil pump driven by the engine of the vehicle which serves as said pressure source for said primary regulator valve, and wherein said pressure source for said secondary regulator valve is excess fluid resulting from said regulation of said primary line pressure.

* * * * *